United States Patent
Idgunji

(10) Patent No.: US 9,195,434 B2
(45) Date of Patent: Nov. 24, 2015

(54) POWER SUPPLY FOR RING-OSCILLATOR BASED TRUE RANDOM NUMBER GENERATOR AND METHOD OF GENERATING TRUE RANDOM NUMBERS

(71) Applicant: Nvidia Corporation, Santa Clara, CA (US)

(72) Inventor: Sachin Idgunji, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 205 days.

(21) Appl. No.: 14/154,463

(22) Filed: Jan. 14, 2014

(65) Prior Publication Data

US 2015/0199176 A1    Jul. 16, 2015

(51) Int. Cl.
*G06F 7/58* (2006.01)
*G06F 1/26* (2006.01)

(52) U.S. Cl.
CPC . *G06F 7/588* (2013.01); *G06F 1/26* (2013.01)

(58) Field of Classification Search
None
See application file for complete search history.

(56) References Cited

U.S. PATENT DOCUMENTS

| | | | | |
|---|---|---|---|---|
| 4,905,176 | A * | 2/1990 | Schulz | G06F 7/584 380/46 |
| 2006/0218212 | A1* | 9/2006 | Mattison | H03K 3/84 708/251 |
| 2009/0106339 | A1* | 4/2009 | Vasyltsov et al. | H03K 3/84 708/251 |
| 2009/0222502 | A1* | 9/2009 | Ikegami et al. | G06F 7/588 708/251 |

OTHER PUBLICATIONS

T. Nakura, M. Ikeda and K. Asada, "Ring oscillator based random number generator utilizing wake-up time uncertainty", Proc. IEEE Asian Solid-State Circuits Conf., pp. 113-116, 2009.*
Amaki, Takehiko, Masanori Hashimoto, and Takao Onoye. "An oscillator-based true random number generator with jitter amplifier." Circuits and Systems (ISCAS), 2011 IEEE International Symposium on. IEEE, 2011.
Bochard, Nathalie, et al. "True-randomness and pseudo-randomness in ring oscillator-based true random number generators." International Journal of Reconfigurable Computing 2010 (2011).
Brar, Keerat, and Shashi Prashanth Karanam. "True Random Number Generators.".
Jessa, Mieczyslaw, and Lukasz Matuszewski. "The use of delay lines in a ring-oscillator-based combined true random number generator." Signals and Electronic Systems (ICSES), 2012 International Conference on. IEEE, 2012.
Markettos, A. Theodore, and Simon W. Moore. "The frequency injection attack on ring-oscillator-based true random number generators." Cryptographic Hardware and Embedded Systems—CHES 2009. Springer Berlin Heidelberg, 2009. 317-331.
Matuszewski, Łukasz, and Mieczyslaw Jessa. "An Auxiliary Source of Randomness for Combined TRNG Based on Ring Oscillators."
Suresh, Vikram Belur. On-chip True Random Number Generation in Nanometer CMOS. Diss. University of Massachusetts Amherst, 2012.

(Continued)

*Primary Examiner* — Chuong D Ngo
*Assistant Examiner* — Matthew Sandifer

(57) ABSTRACT

A true random number generator, a method of generating a true random number and a system incorporating the generator or the method. In one embodiment, the generator includes: (1) a ring oscillator including inverting gates having power inputs and (2) a time-varying power supply coupled to the power inputs to provide power thereto and including power perturbation circuitry operable to perturb the power provided to at least one of the power inputs.

18 Claims, 4 Drawing Sheets

(56) References Cited

OTHER PUBLICATIONS

Târş a, I. G., G-D. Budariu, and Constantin Grozea. "Study on a true random number generator design for FPGA." Communications (COMM), 2010 8th International Conference on. IEEE, 2010.

Vasyltsov, Ihor, et al. "Fast digital TRNG based on metastable ring oscillator."Cryptographic Hardware and Embedded Systems—CHES 2008. Springer Berlin Heidelberg, 2008. 164-180.

Yoo, Sang-Kyung, et al. "Improving the robustness of ring oscillator TRNGs."ACM Transactions on Reconfigurable Technology and Systems (TRETS) 3.2 (2010): 9.

* cited by examiner

POWER SUPPLY FOR RING-OSCILLATOR BASED TRUE RANDOM NUMBER GENERATOR AND METHOD OF GENERATING TRUE RANDOM NUMBERS

TECHNICAL FIELD

This application is directed, in general, to random number generators and, more specifically, to true random number generators (TNRGs) based on ring oscillators (ROs).

BACKGROUND

A random number generator (RNG) is an algorithm or circuit operable to generate a sequence of numbers or symbols that bear no discernable relationship to one another, i.e., appear random. RNGs have many significant uses, including gaming, statistical analysis, simulation and, perhaps most crucially, cryptography. While algorithmic pseudo-random number generators ("PRNG"s) are capable of generating difficult-to-predict numbers, memory limitations force their output eventually to repeat. This compromises and renders them of limited use for particularly demanding applications.

Assuming "true" random numbers exist, natural (i.e., physical) processes, as opposed to man-made algorithms, provide the most likely source for true random numbers. Many natural processes yield numbers that defy current prediction techniques, but almost all are prohibitively expensive to implement in hardware (e.g., an integrated circuit (IC) that can be readily employed in a computer) or otherwise unsuitable (e.g., cannot generate true random numbers at a suitable rate).

One natural process, however, has proven to be a useful basis for a true random number generator ("TRNG"), and that is electronic noise, particularly evidencing itself as phase noise (or "jitter") in a ring oscillator (RO). As those skilled in the pertinent art are familiar, an RO is constructed by series-coupling an odd number of signal inverting gates (e.g., inverters) in a loop. An input state of one of the inverting gates is then toggled, causing a cascading state change in each subsequent inverting gate that resonates around the RO at a frequency that is largely a function of the time constants of the inverting gates. ROs are commonly used as a source of clock signals and therefore engineered for frequency stability using various known techniques for attenuating jitter. However, if jitter is left unchecked, ROs become sources of randomness, or "entropy," and thus capable of serving as the heart of a TRNG. Various conventional techniques have been developed to take advantage of the jitter an RO can exhibit.

SUMMARY

One aspect provides a TRNG. In one embodiment, the TRNG includes: (1) an RO including inverting gates having power inputs and (2) a time-varying power supply coupled to the power inputs to provide power thereto and including power perturbation circuitry operable to perturb the power provided to at least one of the power inputs.

Another aspect provides a method of generating true random numbers. In one embodiment, the method includes: (1) causing a ring oscillator having inverting gates to oscillate, (2) perturbing power provided to at least some of the inverting gates to change an operation of the at least some of the inverting gates and (3) latching an output signal provided by the RO.

Yet another aspect includes a TRNG system. In one embodiment, the system includes a TRNG having: (1a) an RO including inverting gates having power inputs and (1b) a time-varying power supply coupled to the power inputs to provide power thereto and including power perturbation circuitry operable independently to perturb the power provided to at least some of the power inputs, (2) further ROs coupled to the time-varying power supply and operable to drive the power perturbation circuitry and (3) a pseudo-random number generator coupled to an output of the TRNG and operable to generate a pseudo-random number sequence based on a seed provided by the TRNG.

BRIEF DESCRIPTION

Reference is now made to the following descriptions taken in conjunction with the accompanying drawings, in which.

DETAILED DESCRIPTION

Various conventional approaches have been made to accentuate jitter in an RO-based TRNG, such as using multiple ROs, frequency dividers and jitter amplifiers. While these have been more or less effective at creating a suitable TRNG, it is realized herein that these conventional approaches involve manipulating the frequency domain of the RO by slewing the signals provided to or by the inverters in the RO to achieve a desired, "random" output distribution that the TNRG generates. In other words, the conventional approaches exploit frequency as their sole degree of freedom.

It is realized herein that an additional degree of freedom exists that can be exploited in lieu of or in addition to frequency: voltage. It is further realized herein that the power supplied to an RO can be perturbed (i.e. varied over time), and that doing so changes the behavior (e.g., the time constants) of the inverters in, or other components associated with, the RO. It is still further realized herein that changing the voltage of the power supply has the effect of introducing additional noise into the RO. As a consequence, the randomness of the resulting output distribution of the RO may be enhanced. Stated another way, the power supply noise amplifies any phase noise that exists in the RO. More specifically, it is realized herein that the inverters may be selectively starved of current to cause their time constants to vary unpredictably. It is still further realized that the power supplied to each inverter in an RO may be varied independently to increase the randomness in the resulting output distribution.

Introduced herein are various embodiments of an RO-based TRNG, a method of generating true random numbers and an RO-based TRNG system. In general, the embodiments employ a power supply that may be configured to time-vary the power supplied to the RO, increasing the entropy of its output. Certain of the embodiments employ a power supply having multiple outputs such that different voltages can be supplied to different components in the RO or associated circuitry.

Figure 1:
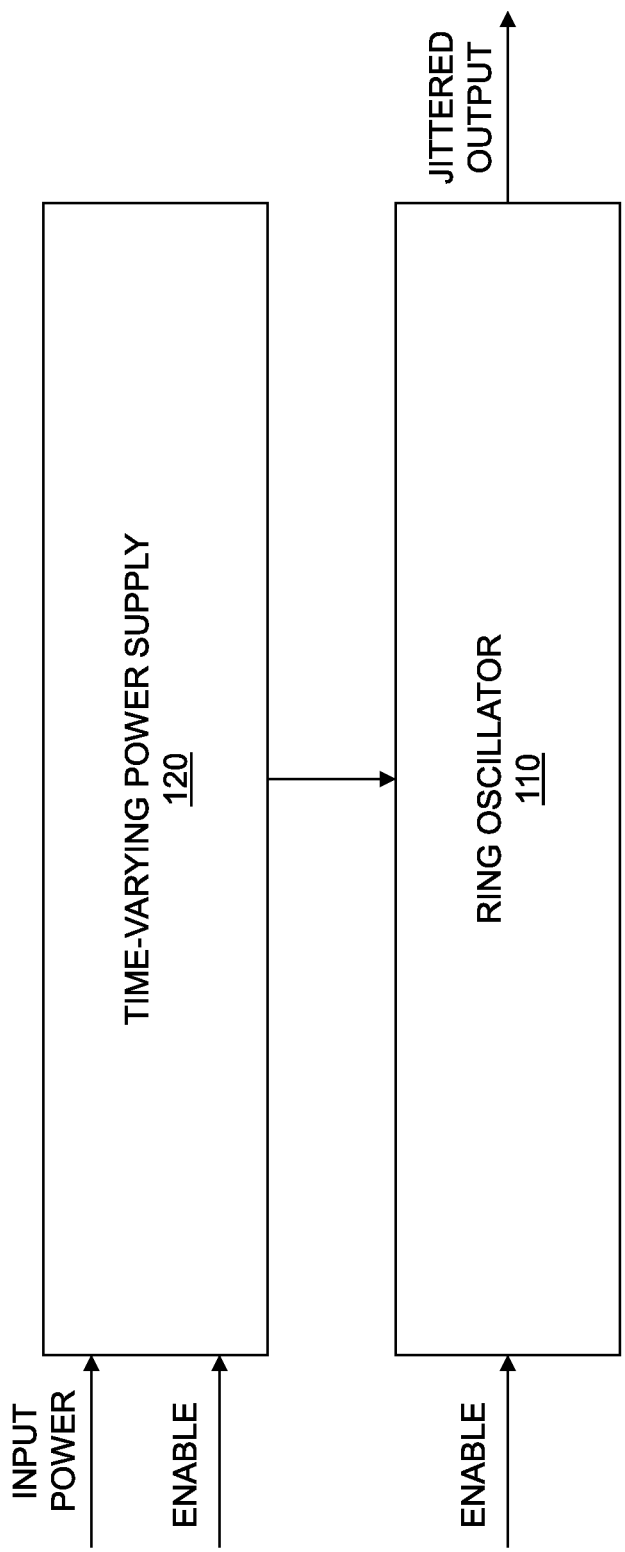
FIG. 1 is a block diagram of one embodiment of an RO-based TRNG.

FIG. 1 is a block diagram of one embodiment of an RO-based TRNG. A RO 110 includes inverting gates (not shown in FIG. 1) having power inputs (also not shown in FIG. 1). The RO 110 is configured to accept an enable signal and generate a jittered output when the enable signal is asserted. A time-varying power supply 120 is illustrated as being coupled to the RO 110. More specifically, the time-varying power supply is coupled to at least one of the power inputs of the inverting gates in the RO 110 to provide power to the at least one of the power inputs. The time-varying power supply is configured to accept input power, which, in one embodiment, is a standard power rail of an IC, such as $V_{DD}$.

Although not shown in FIG. 1, the time-varying power supply 120 includes power perturbation circuitry operable to perturb (i.e. change, perhaps in an unpredictable way) the power provided to the at least one of the power inputs. The time-varying power supply 120 is configured to accept an enable signal that enables the power perturbation circuitry to perturb the power when the enable signal is asserted.

To operate the RO-based TRNG of FIG. 1, input power may be provided to the time-varying power supply 120. Enable signals may be asserted to the time-varying power supply 120 and the RO 110 to enable the power perturbation circuitry to perturb the power provided to the at least one of the power inputs of the inverting gates in the RO 110 and enable the RO 110 to generate a jittered output.

Figure 2:
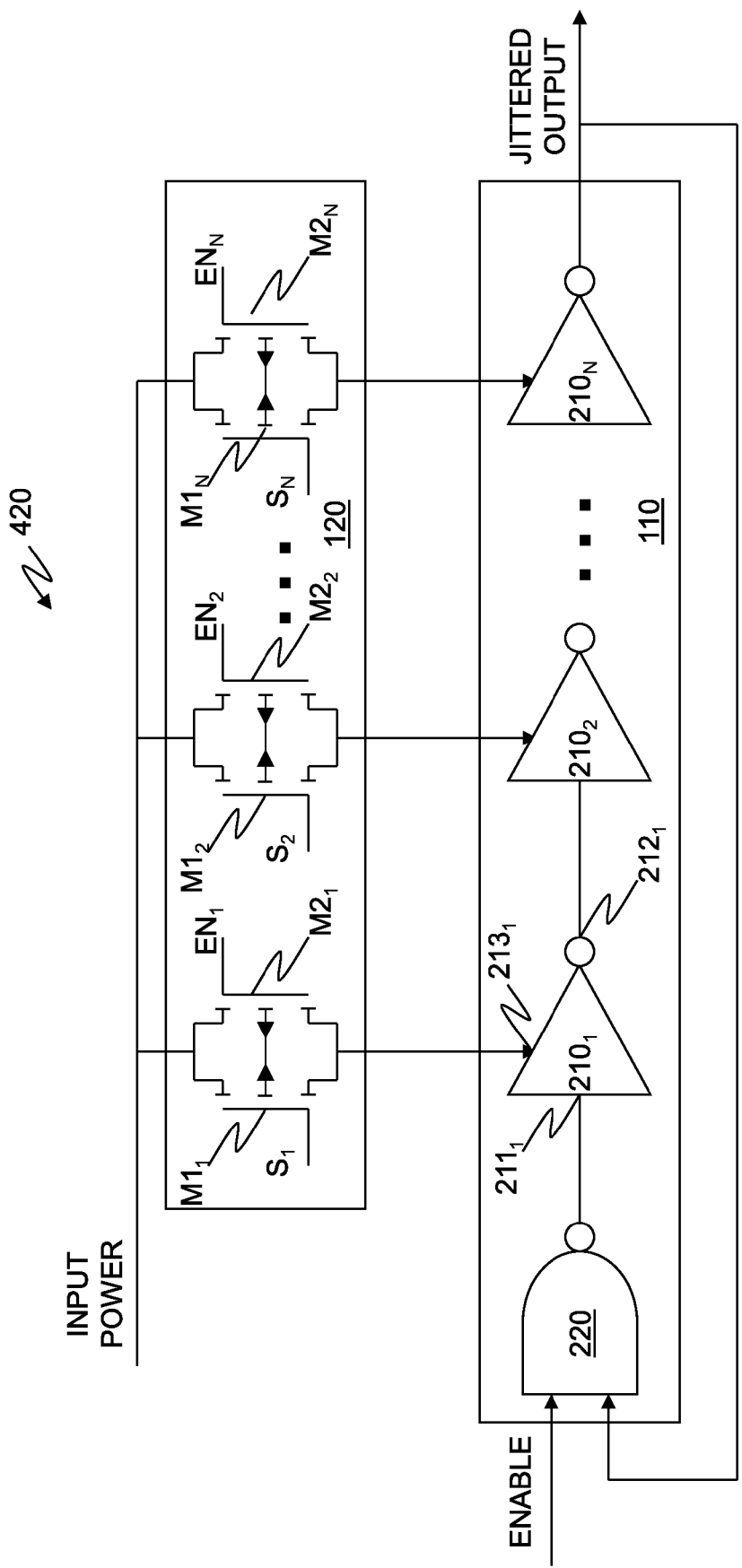
FIG. 2 is a schematic of at least a portion of the RO-based TRNG of FIG. 1.

FIG. 2 is a schematic of at least a portion of the RO-based TRNG of FIG. 1. The RO 110 includes a plurality of inverting gates $210_1, 210_2, \ldots, 210_N$ (also known as inverting circuits, inverters or NOT gates) series-coupled in a loop. As FIG. 2 illustrates, each of the inverting gates has a signal input, a signal output and a power input. For example, the inverting gate $210_1$ has a signal input $211_1$, a signal output $212_1$ and a power input $213_1$. The power input $213_1$ provides power to the inverting gate $210_1$, allowing the inverting gate $210_1$ to invert a signal present at the signal input $211_1$ to yield an inverted signal at the signal output $212_1$. As those skilled in the pertinent art understand, the signal input $211_1$ and the power input $213_1$ are separate and distinct from one another and perform different functions; one skilled in the art would not confuse them with each other.

A NAND gate 220 is included in the loop and operable to allow an ENABLE signal to be asserted. When asserted, the ENABLE signal causes an input state of one of the inverting gates (specifically the inverting gate $210_1$ to be toggled. This, in turn, causes a cascading state change in each subsequent inverting gate $210_2, \ldots, 210_N$ that resonates around the RO 110 at a frequency that is largely a function of the time constants of the inverting gates $210_1, 210_2, \ldots, 210_N$. The RO 110 produces a jittered output as shown, which may be provided to further circuitry, such as a latch or an entropy analyzer.

The time-varying power supply 120 includes power perturbation circuitry operable to perturb the power provided to at least one of the power inputs of the inverting gates $210_1, 210_2, \ldots, 210_N$ in the RO 110. In the embodiment of FIG. 2, the power perturbation circuitry operable to perturb the power provided to all of the power inputs of the inverting gates $210_1, 210_2, \ldots, 210_N$ in the RO 110. In the specific embodiment of FIG. 2, the power perturbation circuitry includes a plurality of power gates $M1_1, M2_1, M1_2, M2_2, \ldots, M1_N, M2_N$. The power gates $M1_1, M2_1$ correspond to the inverting gate $210_1$; the power gates $M1_2, M2_2$ correspond to the inverting gate $210_2$; and the power gates $M1_N, M2_N$ correspond to the inverting gate $210_N$.

In general, the power perturbation circuitry is operable to change the amount of power provided to the at least one of the inverting gates $210_1, 210_2, \ldots, 210_N$. In one embodiment, an inverting gate may operate at a nominal $V_{DD}$ of between about 2.4 volts and about 3.3 volts. Thus, the power perturbation circuitry may be operable to increase $V_{DD}$ to over about 3.3 volts and under about 2.4 volts. It is presumed that the inverting gate will experience a changing time-constant, increasing the jitter in its output.

In the illustrated embodiment, the power perturbation circuitry is operable temporarily to starve the at least one of the inverting gates $210_1, 210_2, \ldots, 210_N$ of a nominal operating current. Those skilled in the pertinent art are familiar with current starving, in which a current-consuming circuit, such as an inverting gate, is deprived of the current it requires to carry out its function at nominal speeds. As those skilled in the pertinent art are aware, current-starving a circuit slows the rate at which a signal propagates through it. When the circuit in question is an inverting gate, current starvation increases the time elapsing between the toggling of the state of the signal input and the toggling of the state of the signal output. In one embodiment, an inverting gate may operate at a nominal $V_{DD}$ of between about 0.7 and about 1.0 volts. Current starvation may begin to occur at about 0.4 volts. Thus, the power perturbation circuitry may be operable to decrease $V_{DD}$, in a time-varying manner from between about 0.7 and about 1.0 volts to about 0.4 volts. This is but one example. Those skilled in the pertinent art will understand that nominal operating voltages and levels at which current starvation occurs may differ depending upon circuit topologies and technologies.

The power gates $M1_1, M2_1, M1_2, M2_2, \ldots, M1_N, M2_N$ are illustrated as being p-channel metal oxide semiconductors (PMOSs). Thus, power gates $M1_1, M2_1, M1_2, M2_2, \ldots, M1_N, M2_N$ turn off when signals are asserted at their respective gates and turn on when signals are deasserted at their respective gates. The power gates $M1_1, M1_2, \ldots, M1_N$ are configured to receive respective switching signals $S_1, S_2, \ldots, S_N$. The power gates $M2_1, M2_2, \ldots, M2_N$ are configured to receive respective enable signals $EN_1, EN_2, \ldots, EN_N$.

To operate the RO-based TRNG of FIG. 1, input power may be provided to the time-varying power supply 120. Enable signals may be asserted to the time-varying power supply 120 (i.e. $EN_1, EN_2, \ldots, EN_N$) and the RO 110 and switching signals $S_1, S_2, \ldots, S_N$ may be asserted and deasserted to cause the power perturbation circuitry to perturb the power provided to the at least one of the power inputs of the inverting gates $210_1, 210_2, \ldots, 210_N$ in the RO 110 and enable the RO 110 to generate a jittered output.

Figure 3:
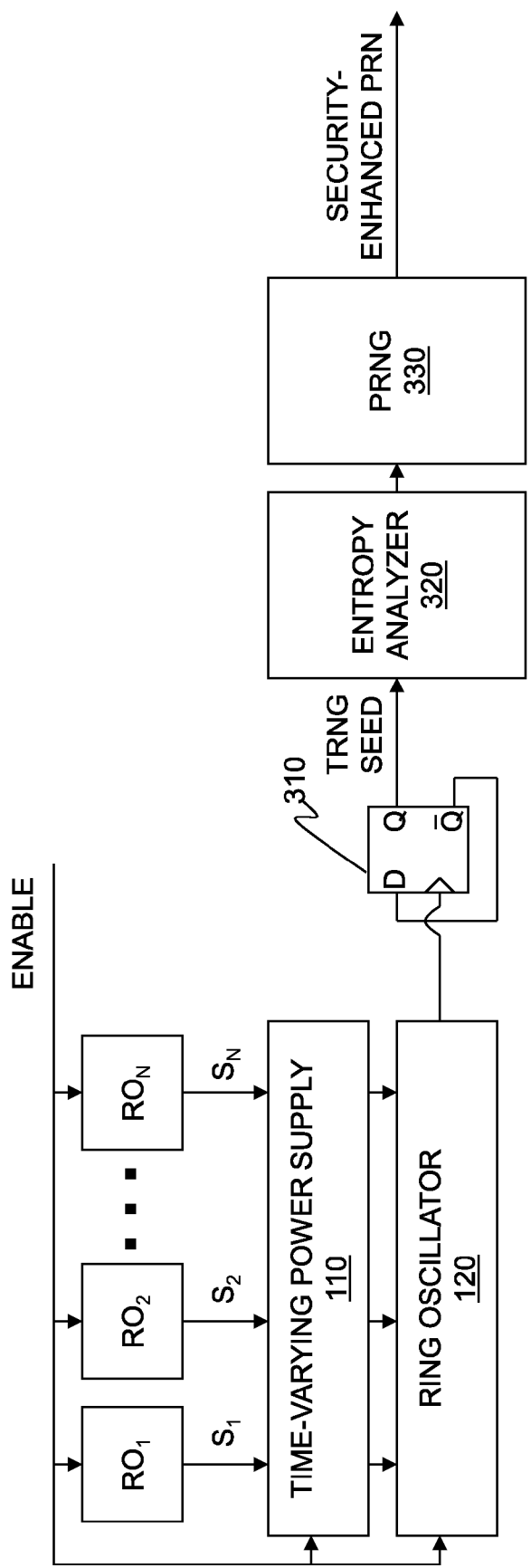
FIG. 3 is a block diagram of one embodiment of an RO-based TRNG system.

FIG. 3 is a block diagram of one embodiment of an RO-based TRNG system that includes embodiments of the time-varying power supply 110 and the RO 120. FIG. 3 also illustrates a plurality of further ring oscillators $RO_1, RO_2, \ldots, RO_N$ coupled to the time-varying power supply 110 and operable to drive the power perturbation circuitry therein. The plurality of further ring oscillators $RO_1, RO_2, \ldots, RO_N$ may be employed to provide entropy sources to cause the time-varying power supply 110 to perturb the power supplied to the RO 120 in unpredictable ways. In one embodiment, the further ring oscillators $RO_1, RO_2, \ldots, RO_N$ have different characteristics (e.g., different numbers of inverting gates and/or inverting gates of different electrical characteristics) to enhance the entropy of the power supplied to the RO 120.

In the embodiment of FIG. 3, the output of the RO 120 is provided to a latch 310, which may take the form of a D-type flip-flop. In the embodiment of FIG. 3, the output of the RO 120 is provided to the clock input of the latch 310, and the inverted (Q) output of the D-type flip flop is coupled to its input (D). Accordingly, the noninverted (Q) output of the D-type flip flop toggles state (inverts) every time the output of the RO 120 is asserted. The result is a binary output that can serve as a seed. In the embodiment of FIG. 3 the seed is provided to an entropy analyzer 320 operable to analyze the randomness of the RO 110 output. Those skilled in the pertinent art are familiar with the structures and function of conventional entropy analyzers. The invention encompasses conventional and later-developed entropy analyzers. In the embodiment of FIG. 3, the seed is also provided to a PRNG 330 operable to generate a pseudo-random number sequence based on the seed provided by the RO 120. Those skilled in the pertinent art are familiar with various conventional algorithms and circuits that may be employed as PRNGs. The invention encompasses conventional and later-developed PRNGs. Because the RO 110 is capable of occasionally providing new TRNG seeds to the PRNG 330, the output of the PRNG 330 need never repeat itself. Security is enhanced if the PRNG 330 output does not repeat. For this reason, the output of the PRNG 330 is termed a "security-enhanced PRN."

A system controller may be employed in the embodiment of FIG. 3 to control the entropy of the TRNG. In one embodiment, the system controller is a programmable digital block that can control further ring oscillators $RO_1, RO_2, \ldots, RO_N$. In one embodiment, the system controller can enable one or more of the further ring oscillators $RO_1, RO_2, \ldots RO_N$ using the respective enable signals $EN_1, EN_2, \ldots, EN_N$ to increase or decrease the entropy of the TRNG and, in turn, the PRNG.

Figure 4:
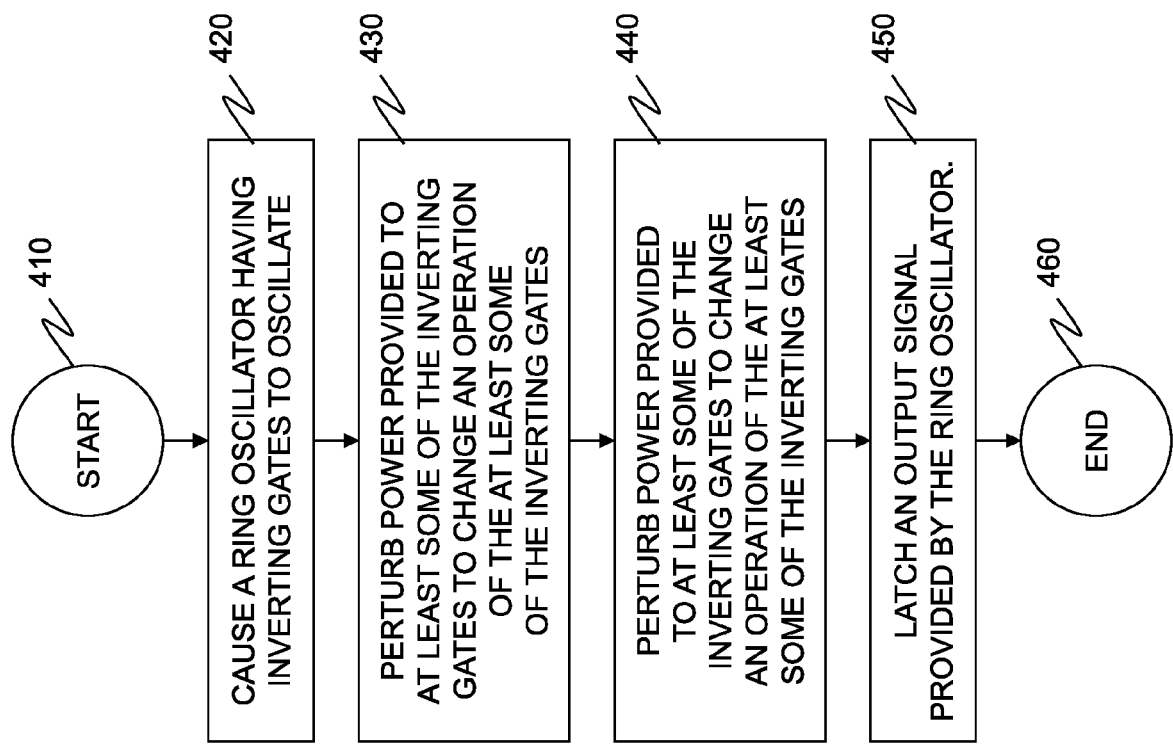
FIG. 4 is a flow diagram of one embodiment of a method of generating true random numbers.

FIG. 4 is a flow diagram of one embodiment of a method of generating TRNs. The method begins in a start step 410. In a step 420, an RO having inverting gates is caused to oscillate. In a step 430, power is received from a standard IC power rail (e.g., $V_{DD}$). In a step 440, power provided to at least some of the inverting gates is perturbed to change an operation of the at least some of the inverting gates. In one embodiment, the perturbing includes perturbing power provided to all of the inverting gates. In one embodiment, the perturbing includes independently changing the operation of the at least some of the inverting gates. In one embodiment, the perturbing includes temporarily starving the at least one of the inverting gates of a nominal operating current. In one embodiment, the perturbing includes perturbing the power based on received switch and enable signals. In one embodiment, the perturbing comprises perturbing based on an enable signal received from a further RO. In a step 450, an output signal provided by the RO is latched. The method ends in an end step 460.

Those skilled in the art to which this application relates will appreciate that other and further additions, deletions, substitutions and modifications may be made to the described embodiments.

What is claimed is:

1. A true random number generator, comprising:
a ring oscillator including inverting gates having power inputs and operable to generate a jittered output;
a time-varying power supply coupled to said power inputs to provide power thereto and including power perturbation circuitry operable independently to perturb said power provided to at least some of said power inputs; and
further ring oscillators coupled to said time-varying power supply and operable to drive said power perturbation circuitry,
wherein at least one random number is generated from said jittered output of said ring oscillator.

2. The generator as recited in claim 1 wherein said power perturbation circuitry is operable to perturb said power provided to all of said power inputs.

3. The generator as recited in claim 1 wherein said power perturbation circuitry is operable temporarily to starve said at least one of said inverting gates of a nominal operating current.

4. The generator as recited in claim 1 wherein said time-varying power supply is operable to receive power from a standard integrated circuit power rail.

5. The generator as recited in claim 1 wherein said power perturbation circuitry is operable to perturb said power based on switch and enable signals received thereby.

6. The generator as recited in claim 1 wherein said further ring oscillators provide enable signals to said power perturbation circuitry.

7. A method of generating true random numbers, comprising:
causing a ring oscillator having inverting gates to oscillate;
providing power to power inputs of said inverting gates by a time-varying power supply;
independently perturbing power provided to at least some of said inverting gates by power perturbation circuitry to change an operation of said at least some of said inverting gates, said perturbing based on enable signals received from further ring oscillators; and
latching an output signal provided by said ring oscillator, wherein at least one random number is generated therefrom.

8. The method as recited in claim 7 wherein said perturbing comprises perturbing power provided to all of said inverting gates.

9. The method as recited in claim 7 wherein said perturbing comprises independently changing said operation of said at least some of said inverting gates.

10. The method as recited in claim 7 wherein said perturbing comprises temporarily starving said at least one of said inverting gates of a nominal operating current.

11. The method as recited in claim 7 further comprising receiving power from a standard integrated circuit power rail.

12. The method as recited in claim 7 wherein said perturbing comprises perturbing said power based on received switch and enable signals.

13. A true random number generator system, comprising:
a true random number generator, including:
a ring oscillator including inverting gates having power inputs, and
a time-varying power supply coupled to said power inputs to provide power thereto and including power perturbation circuitry operable independently to perturb said power provided to at least some of said power inputs;
further ring oscillators coupled to said time-varying power supply and operable to drive said power perturbation circuitry; and
a pseudo-random number generator coupled to an output of said true random number generator and operable to generate a pseudo-random number sequence based on a seed provided by said true random number generator.

14. The system as recited in claim 13 wherein said power perturbation circuitry is operable to perturb said power provided to all of said power inputs.

15. The system as recited in claim 13 wherein said power perturbation circuitry is operable temporarily to starve said at least one of said inverting gates of a nominal operating current.

16. The system as recited in claim 13 wherein said time-varying power supply is operable to receive power from a standard integrated circuit power rail.

17. The system as recited in claim 13 further comprising a latch coupled between said output of said true random number generator and said pseudo-random number generator and operable to generate said seed.

18. The system as recited in claim 13 further comprising an entropy analyzer coupled to said output of said true random number generator.

\* \* \* \* \*